(12) United States Patent
Dögel et al.

(10) Patent No.: US 9,151,373 B2
(45) Date of Patent: Oct. 6, 2015

(54) HYDRODYNAMIC CLUTCH DEVICE

(75) Inventors: Thomas Dögel, Bad Kissingen (DE);
Michael Kühner, Heilbronn (DE);
Ingrid Hoffelner, Knetzgau (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 87 days.

(21) Appl. No.: 13/699,853

(22) PCT Filed: Mar. 3, 2011

(86) PCT No.: PCT/EP2011/053189
§ 371 (c)(1),
(2), (4) Date: Nov. 26, 2012

(87) PCT Pub. No.: WO2011/147598
PCT Pub. Date: Dec. 1, 2011

(65) Prior Publication Data
US 2013/0072338 A1    Mar. 21, 2013

(30) Foreign Application Priority Data

May 25, 2010  (DE) .......................... 10 2010 029 255

(51) Int. Cl.
*F16H 45/00*  (2006.01)
*F16H 35/00*  (2006.01)
*F16F 15/14*  (2006.01)
(Continued)

(52) U.S. Cl.
CPC ................ *F16H 35/00* (2013.01); *F16D 13/38* (2013.01); *F16D 33/18* (2013.01); *F16D 47/06* (2013.01); *F16F 15/131* (2013.01); *F16F 15/13157* (2013.01); *F16F 15/14* (2013.01); *F16F 15/1478* (2013.01); *F16H 45/02* (2013.01); *F16H 47/08* (2013.01); *F16H 57/0006* (2013.01); *H02K 5/24* (2013.01); *H02K 7/006* (2013.01); *F16H 2045/021* (2013.01); *F16H 2045/0205* (2013.01); *F16H 2045/0268* (2013.01)

(58) Field of Classification Search
CPC ... F16H 45/00; F16H 2045/007; F16H 45/02; F16H 2045/0221; F16H 2045/0268; F16D 47/06
USPC ....................... 475/36, 53, 59, 329, 341, 347; 192/55.61, 212
See application file for complete search history.

(56) References Cited

U.S. PATENT DOCUMENTS

| 5,944,610 | A | * | 8/1999 | Sudau | .............................. 464/24 |
| 6,003,650 | A | * | 12/1999 | Kleifges | .................... 192/70.17 |
| 6,099,434 | A | * | 8/2000 | Sasse et al. | .................. 475/347 |
| 6,231,472 | B1 | * | 5/2001 | Sudau et al. | .................. 475/347 |
| 6,334,816 | B1 | * | 1/2002 | Wack et al. | ................ 464/68.92 |

(Continued)

*Primary Examiner* — Roger Pang
(74) *Attorney, Agent, or Firm* — Cozen O'Connor

(57) ABSTRACT

A wet clutch arrangement includes a housing arrangement which is filled or fillable with fluid, a first friction surface formation which is rotatable with the housing arrangement around an axis of rotation and a second friction surface formation which is rotatable with a driven member around the axis of rotation and which can be brought into frictional engagement with the first friction surface formation by a piston pump. At least a portion of a torsional vibration damping arrangement is provided in a torque transmission path and includes an input region and an output region. The torsional vibration damping arrangement further includes at least in a first torque transmission path a phase shifter arrangement for generating a phase shift of rotational irregularities transmitted via the first torque transmission path relative to rotational irregularities transmitted via a second torque transmission path.

21 Claims, 8 Drawing Sheets

(51) Int. Cl.
    *F16H 45/02* (2006.01)
    *F16D 47/06* (2006.01)
    *F16F 15/131* (2006.01)
    *F16H 57/00* (2012.01)
    *F16D 13/38* (2006.01)
    *F16D 33/18* (2006.01)
    *H02K 5/24* (2006.01)
    *H02K 7/00* (2006.01)
    *F16H 47/08* (2006.01)

(56) References Cited

U.S. PATENT DOCUMENTS

| | | | |
|---|---|---|---|
| 7,975,817 B2 * | 7/2011 | Mueller et al. | 192/3.3 |
| 2002/0033310 A1 * | 3/2002 | Sasse et al. | 192/3.29 |
| 2007/0068759 A1 * | 3/2007 | Koppitz et al. | 192/3.3 |
| 2013/0072346 A1 * | 3/2013 | Dogel et al. | 475/347 |
| 2013/0085030 A1 * | 4/2013 | Dogel et al. | 475/59 |
| 2013/0203541 A1 * | 8/2013 | Lorenz et al. | 475/59 |

* cited by examiner

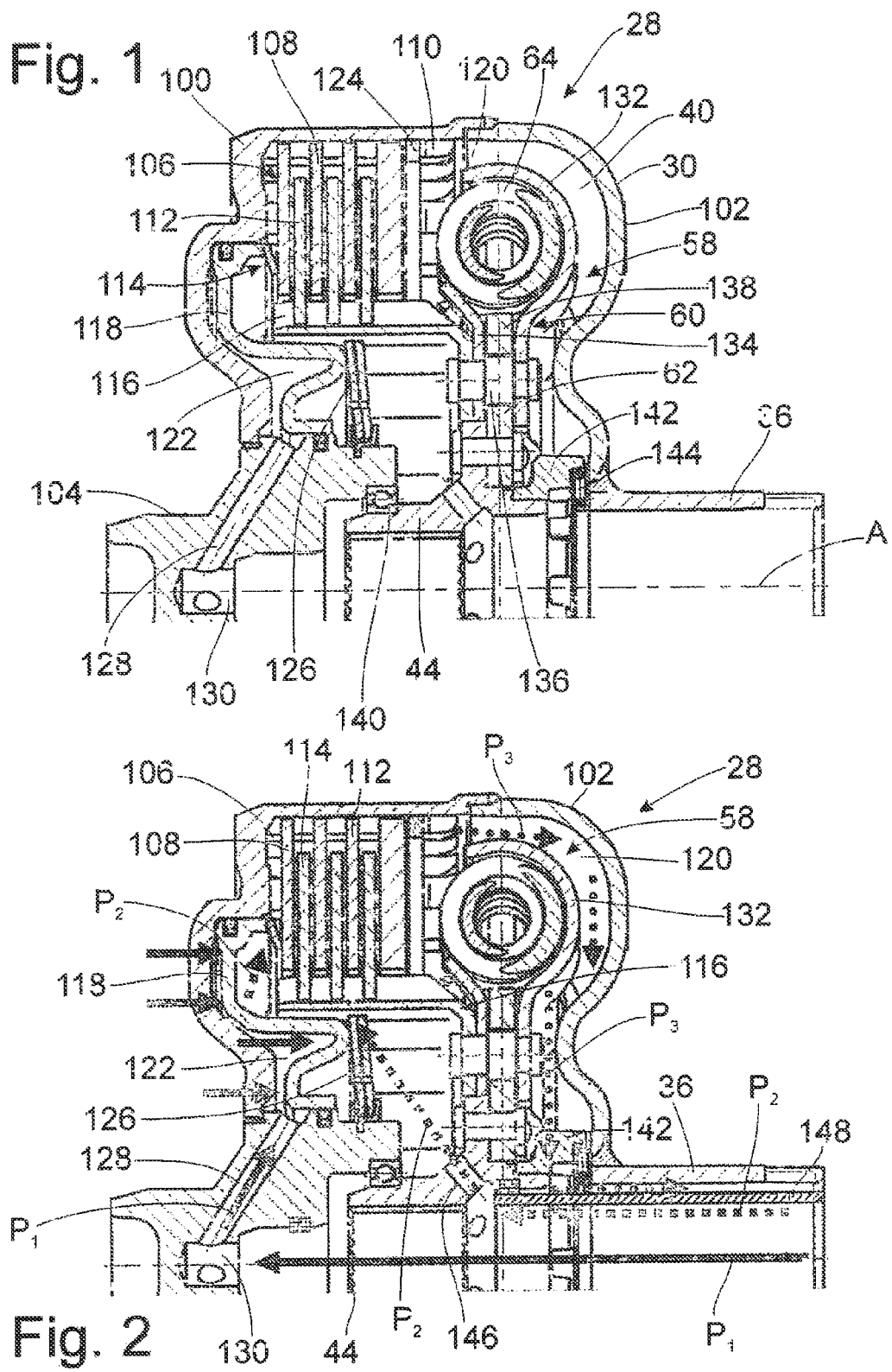
Prior Art

Fig. 3
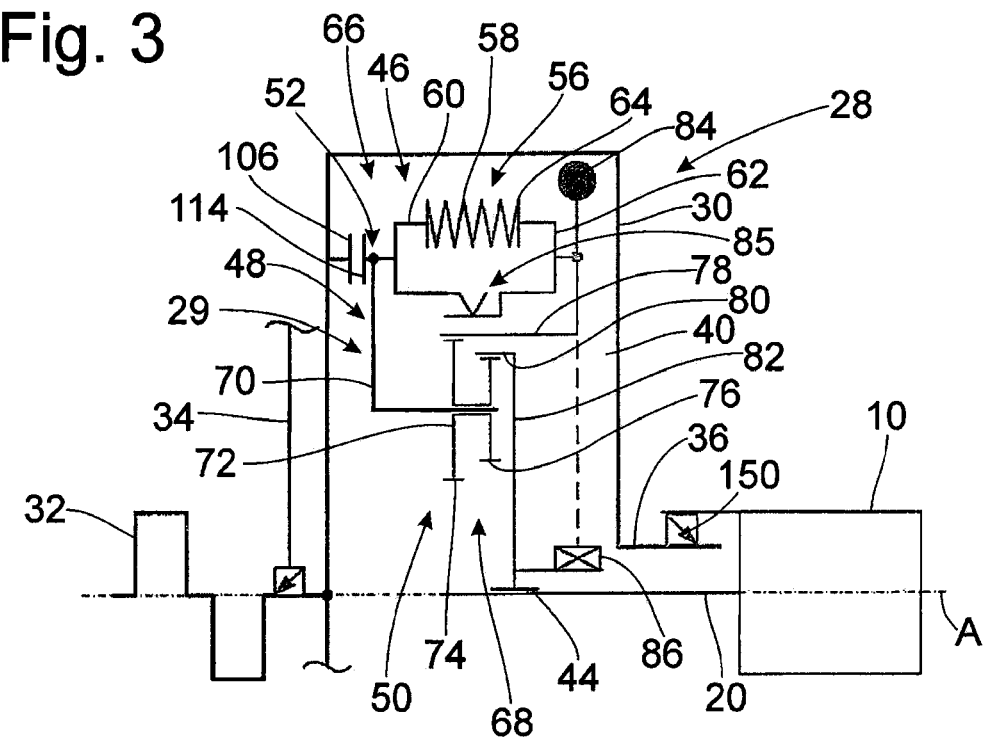
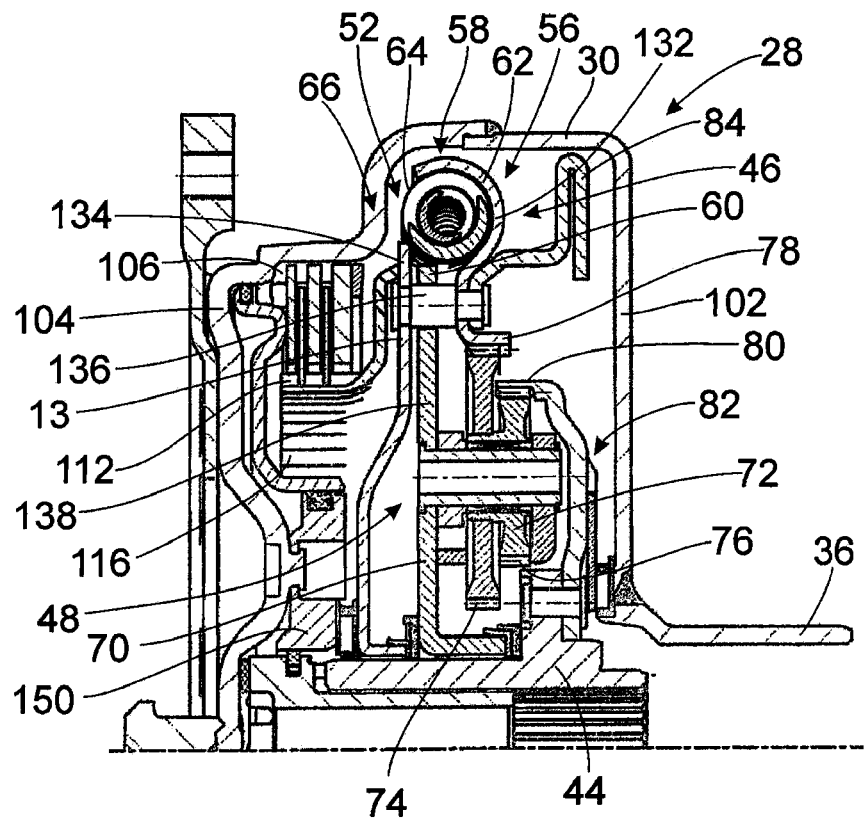
Fig. 4

HYDRODYNAMIC CLUTCH DEVICE

RELATED APPLICATION

The present application is a national stage of International Application No. PCT/EP2011/053189, filed 3 Mar. 2011, and claims priority to German Application No. 10 2010 029 255.9, filed 25 May 2010, the contents of which are incorporated by reference herein.

BACKGROUND INFORMATION

1. Field of the Invention

The present invention is directed to a wet clutch arrangement such as can be used, for example, in the drivetrain of a vehicle.

2. Description of the Related Art

Especially in drivetrains constructed with internal combustion engines, a constant torque can generally not be introduced into a drivetrain because periodic ignitions occur in the internal combustion engines and the energy released as a result is converted into a rotational movement of the crankshaft. The torque delivered by the crankshaft and the rotational speed thereof are both subject to fluctuations and oscillations or, generally speaking, rotational irregularities. Because rotational irregularities of this type may be noticeable in driving mode, a general objective is to eliminate these rotational irregularities as far as possible.

For example, it is known to use energy accumulators or energy storages, for example, springs or moving masses or combinations thereof, to temporarily store the energy occurring in rotational irregularities of the kind mentioned above and then to guide it into the drivetrain in such a way that a smoother speed characteristic or torque characteristic can be achieved. Mass pendulums known as speed-adaptive mass dampers convert the rotational irregularities occurring in driving condition into oscillating deflections of vibrating masses. The deflection is carried out in opposition to centrifugal force and, by predefining the deflection path and the masses to be deflected, it is possible to tune to particular excitation speeds or excitation frequencies. Mass dampers of this type can, of course, be combined with systems of masses which execute oscillations through the use of springs or the like.

Because of the increasingly restricted space availability in modern vehicles, there is also less installation space available for the systems used for vibration damping with consequent loss of decoupling quality, i.e., in the reduction of occurring rotational irregularities.

SUMMARY OF THE INVENTION

It is an object of the present invention to provide a wet clutch arrangement, particularly for a drivetrain with an automatic transmission, which achieves an improved reduction of rotational irregularities introduced into the drivetrain.

According to the invention, this object is met through a wet clutch arrangement, particularly for a drivetrain of a vehicle, comprising a housing arrangement which is filled or fillable with fluid, a first friction surface formation which is rotatable with the housing arrangement around an axis of rotation, a second friction surface formation which is rotatable with a driven member around the axis of rotation and which can be brought into frictional engagement with the first friction surface formation by a piston pump, wherein at least a portion of a torsional vibration damping arrangement is provided in the torque transmission path between the housing arrangement and the driven member, this torsional vibration damping arrangement comprising an input region and an output region, wherein a first torque transmission path and parallel thereto a second torque transmission path and a coupling arrangement for superposing the torques transmitted via the torque transmission paths are provided between the input region and the output region, wherein the torsional vibration damping arrangement further includes at least in the first torque transmission path a phase shifter arrangement for generating a phase shift of rotational irregularities transmitted via the first torque transmission path relative to rotational irregularities transmitted via the second torque transmission path.

In the wet clutch arrangement according to the invention, it is ensured through the use of the phase shifter arrangement that a destructive superposition of oscillation components occurs in the torque to be transmitted in that the transmitted torque is first divided and then recombined by the phase shift that is introduced. Ideally, the rotational irregularities are virtually completely eliminated at least in a particularly critical frequency range. The integration of at least the coupling arrangement in a housing arrangement which is filled or fillable with fluid makes it possible to reduce wear particularly in the region of the coupling arrangement through the fluid and the lubricating effect brought about by it, particularly when the fluid is oil. Influence can also be exerted on the damping behavior because moving components are to be moved against the resistance of the fluid, and energy is dissipated in this way. For this purpose, the housing arrangement can surround at least a portion of the phase shifter arrangement. In an alternative embodiment, at least a portion of the phase shifter arrangement can be arranged outside of the housing arrangement.

In the wet clutch arrangement constructed according to the invention, the first friction surface formation and the second friction surface formation can be provided in the torque flow between the housing arrangement and the torsional vibration damping arrangement or between the torsional vibration damping arrangement and the driven member.

In an alternative embodiment, it can be provided that the first friction surface formation and the second friction surface formation are provided in the torque flow between the phase shifter arrangement and the coupling arrangement. When a connection between the phase shifter arrangement and the coupling arrangement is interrupted by canceling the frictional engagement between the friction surface formations, substantially no torque can be transmitted by the wet clutch arrangement.

In a further alternative embodiment, it is suggested that the first friction surface formation and the second friction surface formation are provided in the torque flow between the housing arrangement and the coupling arrangement. In so doing, the first torque transmission path can be fixedly coupled to the housing arrangement, for example. By means of selectively canceling and producing the frictional engagement between the two friction surface formations in the second torque transmission path, the torque flow can be correspondingly interrupted and produced, respectively, by the wet clutch arrangement.

Each of the friction surface formations can comprise at least one friction element which can be pressed into frictional engagement with an annular disk-shaped friction element of the other friction surface formation by the clutch piston.

In order that this phase shift can be achieved efficiently in a structurally simple manner, it is suggested that the phase shifter arrangement includes an oscillation system having a primary side and a secondary side which is rotatable relative to the primary side around the axis of rotation against the force of a spring arrangement.

The phase shifter arrangement is accordingly constructed substantially on the basis of the operating principle of a dual-mass oscillator in which two masses, i.e., essentially the primary side and secondary side, oscillating relative to one another against the action of the spring arrangement are provided with a desired oscillation behavior through selection of spring stiffness on the one hand and of mass ratios and mass inertia at the primary side and secondary side on the other hand. An oscillation system of this kind characteristically has a resonant frequency. In the frequency range below the resonant frequency, an oscillation system of this kind exhibits subcritical oscillations, i.e., excitation and reaction of the system occur substantially simultaneously. When the resonant frequency is exceeded, a phase shift occurs so that excitation and reaction occur substantially out of phase with one another and the system accordingly operates supercritically. This phase shift which ideally and at most has a value of 180° is made use of by the present invention to achieve the desired reduction in rotational irregularities in that the torque oscillation component that is phase-shifted in this way is superposed with the non-phase-shifted torque oscillation component.

To achieve a further improvement in vibration damping behavior in the torque transmission path to the driven member, it is suggested that the output region includes a further oscillation system with a primary side and with a secondary side which is rotatable relative to the primary side against the action of a spring arrangement.

For example, the driven member can comprise a driven hub which is coupled or can be coupled to a driven shaft, preferably a transmission input shaft, for common rotation around the axis of rotation.

The supply of fluid to the housing arrangement can be ensured, for example, in that the housing arrangement comprises a drive formation for driving a fluid pump for conveying fluid into the housing arrangement. In this way, a fluid pump can also be activated whenever the housing arrangement is driven in rotation around the axis of rotation, and it is therefore ensured that the housing arrangement is sufficiently filled with fluid during operation.

In an embodiment which is very simple in terms of construction and can be realized in a compact manner, it is suggested that the coupling arrangement comprises a planetary transmission arrangement. To this end, it can be provided, for example, that the planetary transmission arrangement includes a planet gear carrier which is connected to the second torque transmission path and which has a plurality of planet gears rotatably supported thereon. It is to be noted that the planet gears can be formed as essentially circular gears, i.e., gears which are toothed around the entire circumference, or alternatively can also be formed as segmented gears.

In order that the planetary transmission arrangement and planet gears thereof can be used in a simple manner for combining the torques or torque components transmitted via the two torque transmission paths, it is suggested that the planetary transmission arrangement includes a first coupling gear arrangement in meshing engagement with the planet gears which is connected to the first torque transmission path and a second coupling gear arrangement in meshing engagement with the planet gears which is connected to the output region.

The torques or torque components to be transmitted via the two torque transmission paths can be influenced in that the first coupling gear arrangement in connection with the planet gears and the second coupling gear arrangement in connection with the planet gears provide transmission ratios that differ from one another.

The first coupling gear arrangement and the second coupling gear arrangement can be constructed in each instance as a ring gear arrangement, i.e., can cooperate with the planet gears in the radially outer region thereof. Alternatively, it can be provided that the first coupling gear arrangement and the second coupling gear arrangement each comprise a sun gear arrangement.

To further influence the vibration damping behavior, it can be provided that the oscillation system and/or the further oscillation system include(s) at least two vibration dampers arranged in series with one another and respectively comprising a primary side and a secondary side which is rotatable relative to the primary side. Alternatively or in addition, it can be provided that the oscillation system and/or the further oscillation system include(s) at least two vibration dampers acting in parallel with one another and respectively comprising a primary side and a secondary side which is rotatable relative to the primary side.

When the oscillation system and/or the further oscillation system comprise(s) a speed-adaptive vibration damping arrangement having at least one deflection mass which can be deflected in circumferential direction from a basic position and which in so doing changes its distance from the axis of rotation, it is further possible to adapt the vibration damping behavior to specific excitation frequencies and orders thereof.

In an alternative embodiment, this can be achieved in that the oscillation system and/or the further oscillation system include(s) a fixed-frequency vibration damping arrangement having at least one oscillation mass which can be deflected against the action of a return spring arrangement.

Further, the vibration damping behavior can be influenced in an advantageous manner in that a friction damping arrangement is associated with the oscillation system and/or with the further oscillation system, which friction damping arrangement opposes a relative rotation between primary side and secondary side thereof.

BRIEF DESCRIPTION OF THE DRAWINGS

The present invention will be described in detail in the following with reference to the accompanying drawings. The drawings show:

FIG. 1 is a fragmentary longitudinal sectional view through a wet clutch arrangement.

FIG. 2 is a view corresponding to FIG. 1 illustrating the fluid flows in the interior of the housing arrangement of the wet clutch arrangement.

FIG. 3 is a schematic fragmentary longitudinal sectional view of a wet clutch arrangement with a torsional vibration damping arrangement.

FIG. 4 is a fragmentary longitudinal sectional view of a wet clutch arrangement with a torsional vibration damping arrangement.

DETAILED DESCRIPTION OF THE PREFERRED EMBODIMENTS

Figure 5:
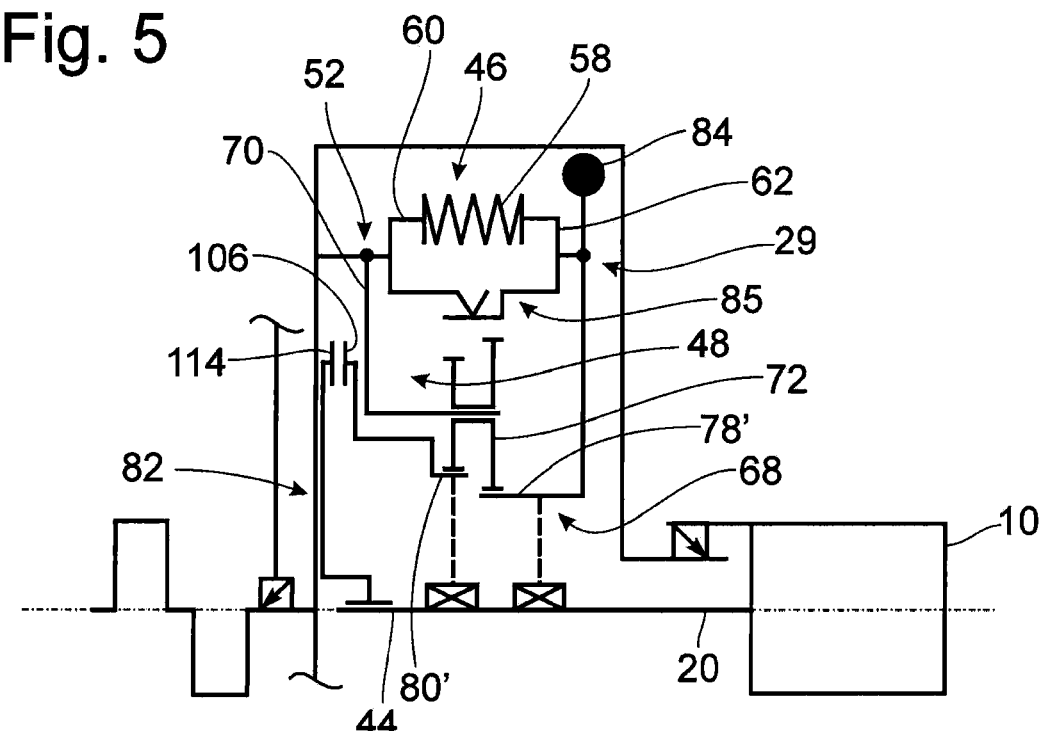
FIG. 5 is a view corresponding to FIG. 3 of an alternative embodiment.

A wet clutch arrangement 28 for the drivetrain of a vehicle is shown in a fragmentary longitudinal section in FIG. 1. This wet clutch arrangement 28 comprises a housing 30 with an engine-side housing shell 100 and a transmission-side housing shell 102 which are fixedly connected radially outwardly, for example, by welding. A pump drive hub 36 which is to be positioned so as to engage in a transmission is connected, e.g., welded, to the transmission-side housing shell 102. A housing hub, designated generally by 104, is connected by welding to the engine-side housing shell 100. Accordingly, the interior 40 of the housing 30 is enclosed so as to be substantially fluid-tight. A fluid exchanging connection to a transmission exists only through the volume region enclosed by the pump drive hub 36.

A first friction surface formation 106 comprising a plurality of plate-like, annular disk-like first friction elements 108 is provided in the interior 40. These first friction elements 108 are formed radially outwardly with a toothed formation and are accordingly in rotational coupling engagement with a tooth-like engagement formation 110 formed at the engine-side housing shell 100. The first friction elements 108 are generally movable in direction of an axis of rotation A with respect to the housing 30. A plate-like, annular disk-like second friction element 112 of a second friction surface formation 114 is located in each instance between two first friction elements 108. These second friction elements 112 have a toothed configuration in their radially inner region and are accordingly in rotational coupling engagement with a friction element carrier 116 but are generally movable in direction of the axis of rotation A with respect to the latter.

A clutch piston 118 is guided so as to be axially movable in a fluid-tight manner radially outwardly at the engine-side housing shell 100 and radially inwardly at the housing shell 104 and divides the interior 40 into a first spatial region 120 containing the friction surface formations 106, 114 and a second spatial region 122. By supplying fluid to the second spatial region 122, as will be described more fully in the following, the clutch piston 118 can be moved axially toward the friction surface formations 106, 114 and, in so doing, the first friction elements 108 and the second friction elements 112 can be brought into mutual frictional engagement. The abutment forms the friction element of friction elements 108 which lies farthest from the clutch piston 118 in axial direction and which is held axially by a supporting ring 124. By means of a pre-loading formation 126 which is supported with respect to the housing hub 104 and which comprises, for example, a plurality of disk springs or the like, the clutch piston 118 is pre-loaded in direction of minimum volume of the second spatial region 122, i.e., basically in the disengaging direction. The fluid supply to and from the second spatial region 122 is carried out via channels 128 which are formed in the housing hub 104 and which lead radially inward and open into an aperture 130 which opens axially toward the interior 40.

A torsional vibration damper, designated by 58, is provided in the interior 40. A primary side 60 thereof comprises two cover disk elements 132, 134 which lie at an axial distance from one another and which are connected in their radially inner region to one another and also to the friction element carrier 116 by rivet bolts 136. A central disk element 138 of a secondary side 62 of the torsional vibration damper 58 lies axially between the two cover disk elements 132, 134 of the primary side 60. The central disk element 138 is radially inwardly fixedly connected to a driven member 44 formed as driven hub, for example, by riveting, but also possibly by being formed integrally.

The primary side 60 and secondary side 62 are coupled by a spring unit 64 for torque transmission. This spring unit 64 comprises one or more springs or groups of springs which are arranged successively in circumferential direction and which can be supported at the cover disk elements 132, 134 on one hand and at the central disk element 138 on the other hand and when compressed allow a relative rotation between the primary side 60 and the secondary side 62.

The driven member 44, which is provided with an inner circumferential toothing and can be coupled in this way to a driven shaft, for example, a transmission input shaft, for common rotation, is axially and/or radially supported with respect to the housing hub 104 by a bearing 140. The bearing 140 can be constructed as a rolling element bearing but, of course, can also be constructed as a plain bearing support. In the other axial direction, the driven member 44 is axially supported by a supporting ring 142 and another bearing 144 so that a defined positioning in the housing 30 is predetermined in axial direction and in radial direction particularly also for the torsional vibration damper 58.

FIG. 2 shows the various fluid flows occurring in operation in the wet clutch arrangement 28. As was already mentioned, the second spatial region 122 can be supplied with fluid via the axially open aperture 130 and the channels 128, which is illustrated by flow arrows $P_1$ in FIG. 2. In so doing, the fluid can be guided in direction of the axially open aperture 130 through a central orifice into a transmission input shaft. By supplying fluid to the second spatial region 122 and by means of the fluid pressure which is brought about in this way, a force results which loads the clutch piston 118 in the engagement direction against the pre-loading action of the pre-loading arrangement 126.

In order to conduct heat out of the area of the friction surface formations 106, 114, which is required particularly in slip mode, fluid can be guided into the first spatial region 120 through apertures 146 provided in the driven member 44 as is indicated by flow arrows $P_2$. This fluid enters radially outwardly into a volume region between the clutch piston 118 and the torsional vibration damper 58 and friction element carrier 116. A positive guiding of the fluid takes place radially outwardly in direction of the friction elements 108, 112 and, accordingly, a compulsory circulation of the fluid takes place. After circulating around the friction elements 108, 112, the fluid flows radially outwardly in direction of a volume region formed between the cover disk element 132 and the housing shell 102 as is indicated by flow arrows $P_3$. In so doing, the fluid arrives radially inward and can pass through openings, not shown, in the supporting ring 142.

In order to separate these fluid flows before the fluid is conducted into the first spatial region 120 and after the fluid is removed from the first spatial region 120, a dividing sleeve 148 can be provided between the transmission input shaft, not shown, and the pump drive hub so that annular flow paths are formed between the outer circumference of the transmission input shaft and the dividing sleeve 148 on the one hand and between the dividing sleeve 148 and the pump drive hub 36 on the other hand.

In order to separate the different flow paths from one another, dynamic seals, for example, are provided between the housing hub 104 and the transmission input shaft, between the driven member 44 and the supporting sleeve 148, and between the clutch piston 118 and the housing shell 100 or housing hub 104.

It will be seen from the preceding description that the wet clutch arrangement 28 shown in FIGS. 1 and 2 is basically a three-line type arrangement. Pressurized fluid is supplied to and guided out of the second spatial region 122 via a first line in order to press the clutch piston 118 in the engagement direction by increasing the fluid pressure in the second spatial region 122 relative to the fluid pressure in the first spatial region 120. Fluid is guided into the first spatial region 120 through a second line which is substantially represented by arrow $P_2$, while fluid is removed from the first spatial region 120 through a third line represented by arrow $P_3$. Of course, the flow direction through the first spatial region can also be reversed. Further, it is to be noted that, of course, the wet clutch arrangement can be modified in a variety of ways with respect to the guidance of the fluid flow and with respect to configuration particularly in the region of the friction surface formations.

The present invention will be described as regards its basic operation and construction in the following referring to FIGS. 3 to 15. It is to be noted that these aspects of the invention described in the following can, of course, also be realized in a wet clutch arrangement such as was described above. In particular, the constructional steps described in the following which contribute to the damping of torsional vibrations can be integrated in the torque transmission path between the friction surface formations and the driven member, i.e., can essentially substitute for or supplement the functionality of the torsional vibration damper described above.

The wet clutch arrangement 28 shown schematically in FIG. 3 comprises the housing 30 which is coupled or can be coupled on the drive side to a drive shaft 32, for example, the crankshaft of an internal combustion engine 34 which is only indicated schematically. By means of this coupling, the housing 30 together with this driveshaft 32 are rotatable around an axis of rotation A which also corresponds, e.g., to the axis of rotation of the transmission input shaft 20.

The housing 30 has a pump drive hub 36 on the side facing the transmission 10. Accordingly, a fluid pump which is internal to the transmission can be activated through rotation of the housing 30 similar to a hydrodynamic torque converter, and fluid can be conveyed into the interior 40 of the housing 30 and also removed again therefrom. The housing 30 and pump drive hub 36, respectively, are sealed with respect to a transmission housing by a dynamic seal 150 so that the interior 40 of the housing 30 is completely enclosed outwardly.

The wet clutch arrangement 28 comprises the driven member 44 in the interior 40 of the housing 30, which driven member 44 is coupled or can be coupled, for example, by toothed engagement, to the transmission input shaft 20 for common rotation therewith. Between the housing 30 and the driven member 44, there are two torque transmission paths 46, 48 of a torsional vibration damping arrangement 29 which are guided together in the area of a coupling arrangement 50 upstream of the driven member 44 constructed as driven hub and are branched in an input region 52. The input region 52 is coupled or can be coupled to the housing 30 by the friction surface formations 106, 114.

The two torque transmission paths 46, 48 branch out in the input region 52. The first torque transmission path 46 thereof comprises a phase shifter arrangement 56 which causes the torque transmitted via this first torque transmission path 46 to undergo a phase shift relative to the torque transmitted via the second torque transmission path 48.

The phase shifter arrangement 56 includes a torsional vibration damper 58 having a primary side 60, a secondary side 62 and a spring unit 64 which opposes a relative rotation between the primary side 60 and the secondary side 62. It is to be noted that the torsional vibration damper 58 can be constructed in a conventional manner and, for example, can comprise as primary side a hub disk and as secondary side two cover disk elements which are disposed on either side thereof and which are fixedly connected to one another. The spring unit 64 can have a plurality of springs, preferably helical compression springs, which are disposed successively in circumferential direction and which, being supported at the primary side 60 and secondary side 62, cause a restoring force thereof with respect to one another in direction of a neutral relative rotational position. Accordingly, in the embodiment example shown in FIG. 3, the torsional vibration damper 58 substantially provides an oscillation system 66 which leads in the first torque transmission path 46 to a phase shift of rotational irregularities or torque oscillations transmitted via this first torque transmission path 46. This oscillation system 66 has a natural frequency or resonant frequency as a result of the masses present at the primary side and secondary side 62 and the spring unit 64 of the torsional vibration damper 58 which provides the spring arrangement of the oscillation system 66 in this case. When vibrations are excited below this natural frequency, vibrations which are to be transmitted are transmitted substantially without a phase shift. When the resonant frequency is exceeded, a phase shift occurs which can ideally amount to at most 180° so that exciting vibrations and transmitted vibrations are out of phase with one another.

The torques or torque components transmitted via the two torque transmission paths 46, 48 are combined again in the coupling arrangement 50. To this end, the coupling arrangement 50 is constructed as a planetary transmission arrangement 68 and comprises a planet gear carrier 70 coupled to the second torque transmission path 48. This planet gear carrier 70 carries a plurality of planet gears 72 distributed in circumferential direction. These planet gears 72 have two sets of teeth 74, 76 which are axially offset with respect to one another and which in the embodiment example shown in FIG. 3 have diameters which differ from one another with respect to the rotational axes of the planet gears 72 at the planet gear carrier 70.

A first ring gear 78 is connected to the secondary side 62 of the torsional vibration damper 58 and oscillation system 66, respectively, and is in meshing engagement with the teeth 74 of the planet gears 72. A second ring gear 80 which substantially also provides an output region 82 of the torsional vibration damping arrangement 46 is in a toothed engagement with the teeth 76 of the planet gears 72. The second ring gear 80 is fixedly connected to the driven member 44 so that the torque flow can also not be selectively interrupted or produced, respectively, in the output region 82, i.e., between the coupling arrangement 50 and the driven member 44, but rather is permanently established. This also applies to the region of the torsional vibration damping arrangement 28 located between the branching in the input region 52 and the joining of the two torque transmission paths 46, 48 in the region of the coupling arrangement 50. The secondary side 62 and the ring gear 78 coupled therewith can be supported at the output region 82, for example, by a bearing 86.

Through cooperation of the planet gears 72 with the two ring gears 78, 80, these planet gears 72 being carried on the planet gear carrier 70 so as to be basically freely rotatable, the planetary transmission arrangement 68 causes the torques transmitted via the two torque transmission paths 46, 48 to be combined. When these torques contain oscillation components and if the frequency of these oscillation components or fluctuation components is below the resonant frequency of the oscillation system 66, the two torques or torque components are combined and superposed in phase in the coupling arrangement 50. The torque transmitted into the output region 82 accordingly also approximately corresponds with respect to its fluctuation characteristic to the torque received in the input region 52 of the lockup clutch 54.

However, if the frequency of the oscillation components lies above the resonant frequency of the oscillation system 66, i.e., of the torsional vibration damper 58 in this instance, the two oscillation components of the torques transmitted via the torque transmission paths 46, 48 are destructively superposed in the coupling arrangement 50. Ideally, i.e., with a phase shift of 180°, the oscillation components can be completely eliminated so that the torque received at the output region 82 has a substantially smoother characteristic or at least a characteristic with appreciably reduced oscillation.

To further influence the damping behavior of the torsional vibration damping arrangement 42, a supplementary mass 84 can be associated, for example, with the secondary side 62 so as to increase the mass on the secondary side 62 and therefore exert an influence on the resonant frequency. Further, a friction damping arrangement, designated by 85, can be associated with the oscillation system 66, which friction damping arrangement 85, for example, can act parallel to the spring unit 64 between the primary side 60 and the secondary side 62 and can be configured as a Coulomb friction device or as a fluid friction device. Providing a friction damping arrangement 85 of this type acting in parallel with the spring unit 64 also substantially influences the magnitude of the phase shift introduced by the oscillation system 66.

The configuration of the torsional vibration damper 58, i.e., the mass at the primary side 60, the mass at the secondary side 62, the stiffness of the spring unit 64, and the supplementary mass 84 reinforcing the secondary-side mass, generally aims for the lowest possible natural frequency of the oscillation system 66 in order to achieve the transition to the supercritical operating condition, i.e., the operating condition working with phase shift, already at comparatively low frequencies of excitations of oscillation, i.e., already at a comparatively low rotational speed.

Due to the fact that the two sets of teeth 74, 76 have diameters or at least effective diameters that differ from one another, and therefore also the two ring gears 78, 80 have ring gears which differ from one another, it is possible to exert an influence on the distribution of torques to the two torque transmission paths 48, 48. The closer the diameters of the ring gears 78, 80 to one another, and therefore the closer the diameters of the sets of teeth 74, 76 to one another, the closer the torque component transmitted via torque transmission path 46 approximates 100%. In the embodiment example shown in FIG. 3 in which the teeth 74 cooperating with the ring gear 78 have a greater diameter, a transmission ratio below 1 is achieved; with the reverse size ratio, a transmission ratio above 1 is achieved. In the former case, the torque transmitted via the first torque transmission path 46 is increased by making use of a torque flow reversal in the second torque transmission path 48, namely, by supporting at the coupling arrangement 50. In this case also, within the meaning of the invention, a destructive superposition of the two torque flows in the torque transmission paths is used to obtain a substantially smoother total torque at the output region 82. In the latter case, i.e., when teeth 76 are larger and teeth 74 are smaller, the torque introduced at the input region 52 is divided corresponding to the size ratios in such a way that a torque flow is carried out in the same direction in both torque transmission paths 46, 48 and the two torque components guided in the same direction are superposed on one another in the coupling device 50.

By providing the wet clutch arrangement 28, shown in FIG. 3, as a closed system, i.e., by providing a volume which is substantially enclosed by the housing 30, it is possible to protect the different system areas contributing to the damping of torsional vibrations from excessive wear by means of the fluid present in the housing 30 during operation. This chiefly concerns the coupling arrangement 50 and planetary transmission arrangement 68 in which the two torque components transmitted via the torque transmission paths 46, 48 are guided together. The movement, e.g., of the planetary transmission arrangement 68 and also of the torsional vibration damper 58 in the fluid, which is generally to be considered as a viscous medium, also influences the damping behavior because energy is dissipated due to the necessity of displacing fluid.

This type of construction of the wet clutch arrangement 28 is suitable above all in connection with an automatic transmission because the supply of fluid to the interior 40 can be ensured in this way. In so doing, a transmission control device which can actuate different valves in order to release or interrupt the flow path to the interior 40 of the housing 30 can be provided in the automatic transmission 10. In so doing, the fluid is removed from the fluid sump and returned to the latter again by the pump which is driven by the housing 30 itself.

FIG. 4 shows an embodiment form of a wet clutch arrangement 28 which is realized according to the construction principle in FIG. 3. It will be seen that the friction element carrier 116 is connected to the central disk element 138 which in this case substantially provides the primary side 60 of the torsional vibration damper 58. This central disk element 138, particularly the radially inner region thereof, similarly forms the planet gear carrier 70 which is bearing-supported on the driven member 44.

The secondary side 62 of the torsional vibration damper 58 comprises the two cover disk elements 132, 134. The cover disk element 134 extends radially inward and is bearing-supported on the driven member 44. In its radially inner region, cover disk element 132 forms the ring gear 78, i.e., is formed integral with the latter, for example, by deformation of a sheet metal blank. A supplementary mass part 84 which is also formed of sheet metal, for example, is connected to the secondary side 62 and therefore to the output side of the oscillation system 66 by means of the rivet bolts 136 which connect the two cover disk elements 132, 134 to one another. The ring gear 80 is guided radially inward, where it is connected, e.g., riveted, to the driven member 44.

In this embodiment form, the two secondary-side cover disk elements 134, 136 together with the mass part 84 contribute to the movement of the output mass and accordingly influence the phase shift of the transmitted oscillations.

The different bearing points serving for axial support, for example, for axial support of the cover disk element 134 with respect to the central disk element 138 or of a piston supporting element 150 connected to the housing shell 104, and the axial support of the central disk element 138 with respect to the driven member 44, can be carried out by plain bear supports and/or rolling element bearing supports. A bearing support with respect to the transmission input shaft is also possible in principle.

FIG. 5 shows an embodiment form in which the planetary transmission arrangement 68 is provided with sun gears 78' and 80', respectively, rather than ring gears, for cooperation with the planet gears 72 which are supported successively in circumferential direction at the planet gear carrier 70 in the second torque transmission path 48. The two sun gears 78', 80' can be supported radially inwardly on the transmission input shaft 20.

In this case, the two friction surface formations 106, 114 which can be brought into frictional engagement for producing the torque transmitting condition lie in the torque flow between the torsional vibration damping arrangement, designated generally by 29, and the driven member 44, i.e., are integrated in the output side 82, for example.

Figure 6:
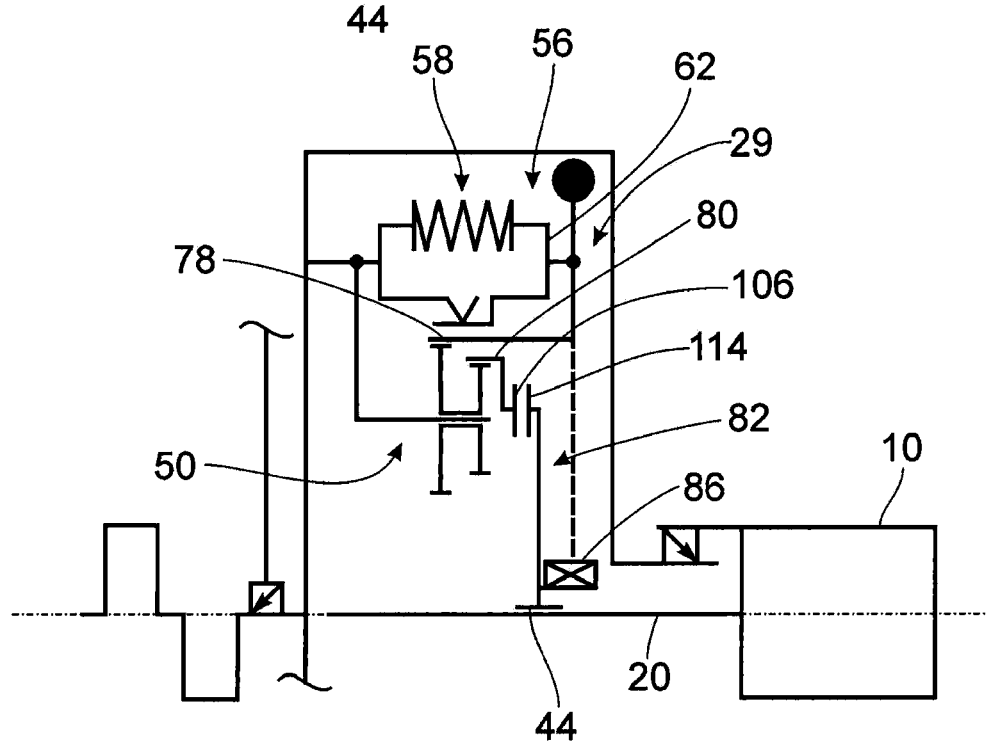
FIG. 6 is a view corresponding to FIG. 3 of an alternative embodiment.

The embodiment shown in FIG. 6 in which the two friction surface formations 106, 114 are again substantially integrated in the output side 82 of the torsional vibration damping arrangement 29, lie in the torque flow, i.e., downstream of the phase shifter arrangement 56 or coupling arrangement 50. The friction surface formation 106 is rotatable in common with the ring gear 80, while friction surface formation 114 is rotatable with the driven member 44. The secondary side 62 of the torsional vibration damper 58 and the ring gear 78 coupled thereto are supported at the output region 82 or possibly also at the transmission input shaft by a bearing support 86.

Figure 7:
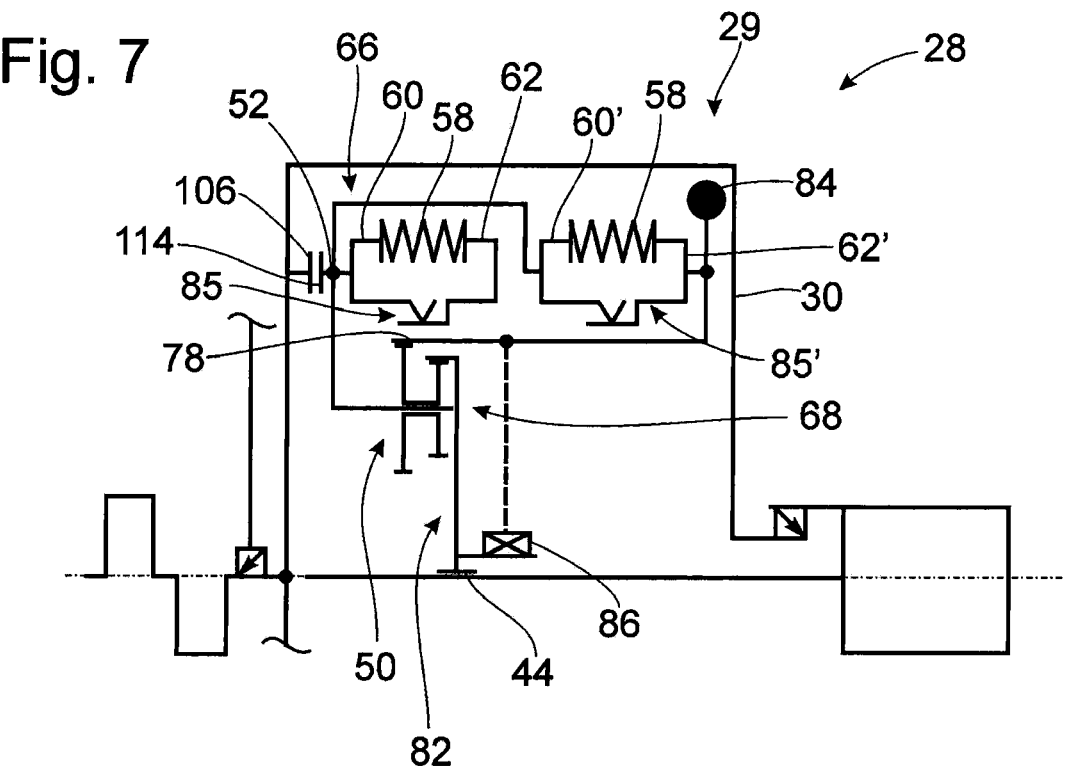
FIG. 7 is a view corresponding to FIG. 3 of an alternative embodiment.

In the embodiment of a wet clutch arrangement 28 shown in FIG. 7, the oscillation system 66 of the torsional vibration damping arrangement 29 comprises two torsional vibration dampers 58, 58' which act in parallel with one another. The two primary sides 60, 60' thereof are coupled together with the input region 52. The two secondary sides 62, 62' are coupled to the ring gear 78 of the coupling arrangement 50 and of the planetary transmission arrangement 68, respectively. The supplementary mass 84 is also connected to these two secondary sides 62, 62'. Further, the latter can be supported at the output region 82 via a bearing support 86.

The two friction surface formations 106, 114 lie in the torque flow upstream of the torsional vibration damping arrangement 29, i.e., are formed to couple the input region 52 to the housing 30 for torque transmission.

As is indicated schematically in FIG. 7, the two torsional vibration dampers 58, 58' can be arranged axially one behind the other. It is also possible to position the latter so as to be nested radially one inside the other or offset axially and radially relative to one another.

Figure 8:
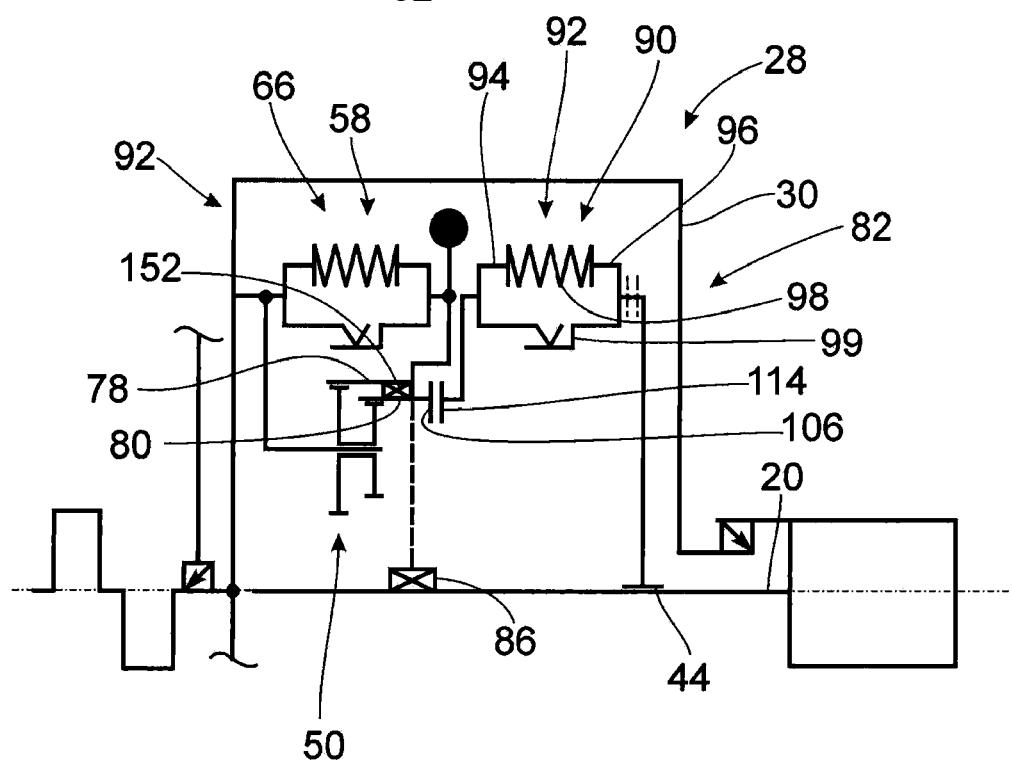
FIG. 8 is a view corresponding to FIG. 3 of an alternative embodiment.

FIG. 8 shows an embodiment in which a further oscillation system 90 is provided in the torque flow between the coupling arrangement 50 and the driven member 44, i.e., substantially in the output region 82. This further oscillation system 90 comprises a torsional vibration damper 92 with a primary side 94, a secondary side 96 and a spring unit 98 acting therebetween. A friction damping arrangement 99 can act parallel to the spring unit 98.

The friction surface formations 106, 114 are arranged in the torque flow between the driven-side ring gear 80 and the primary side 94 of the further oscillation system 90. However, the torque flow could also be selectively interrupted or produced between the secondary side 96 and the driven member 44 as is indicated by dashed lines.

The driven-side ring gear 80 can be rotatably supported, for example, on the transmission input shaft 20, by a bearing support 86. The drive-side ring gear 78 can be supported on the driven-side ring gear 80, for example, by a bearing support 152.

Figure 9:
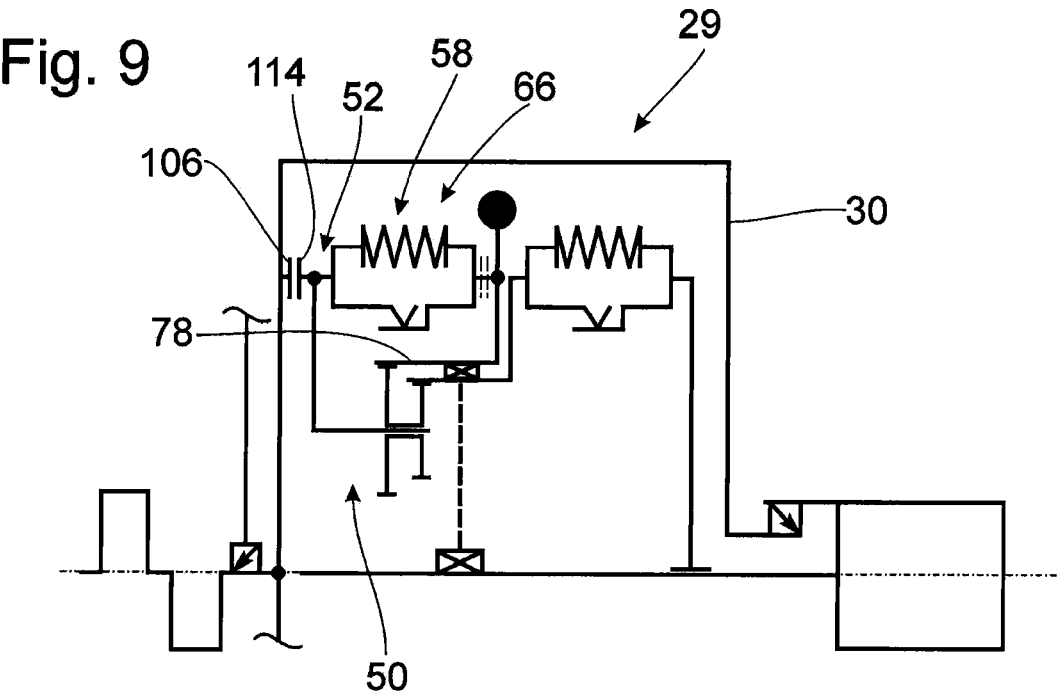
FIG. 9 is a view corresponding to FIG. 3 of an alternative embodiment.

In the embodiment shown in FIG. 9, which corresponds to that shown in FIG. 8 with respect to its basic construction, the two friction surface formations 106, 114 are again arranged in the torque flow between the input region 52 of the torsional vibration damping arrangement 29 and the housing 30. In an alternative indicated by dashed lines, the friction surface formations 106, 114 can also be arranged in the torque flow between the secondary side of the torsional vibration damper 58 or oscillation system 66 and the coupling arrangement 50 or ring gear 78 thereof.

Figure 10:
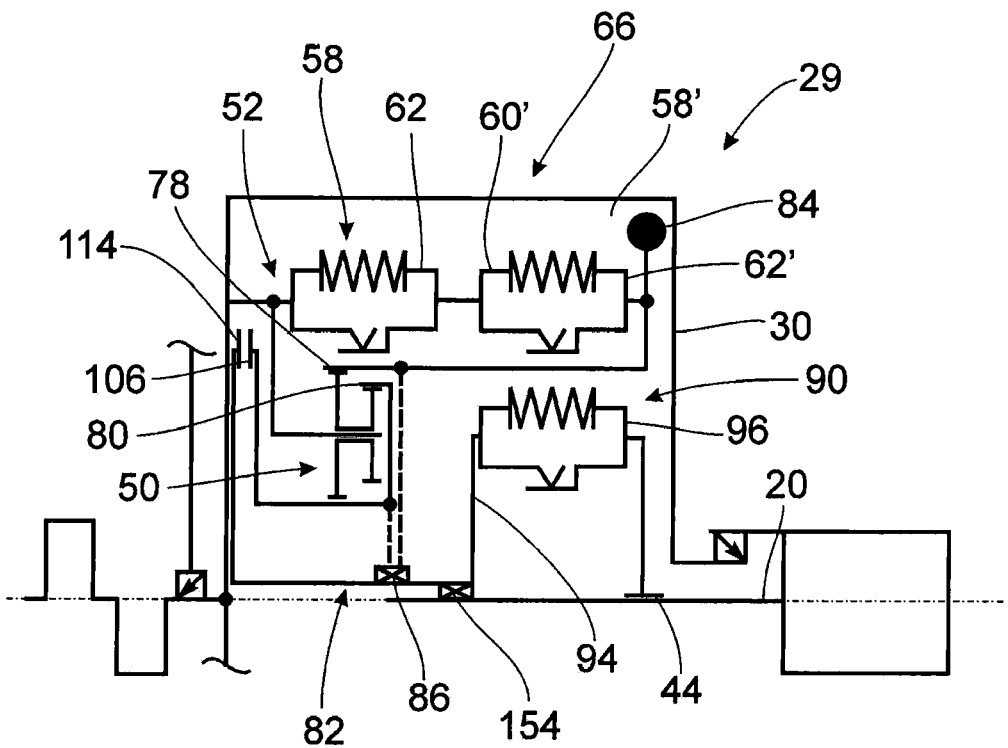
FIG. 10 is a view corresponding to FIG. 3 of an alternative embodiment.

FIG. 10 shows an embodiment in which the oscillation system 66 again comprises two torsional vibration dampers 58, 58'. However, the latter are now connected in series so that the secondary side 62 of the first torsional vibration damper 58 in the torque flow is coupled with the primary side 60' of the second torsional vibration damper 58' following it. The secondary side 6T thereof which is simultaneously also the secondary side of the oscillation system 66 is coupled to the supplementary mass 84 on one hand and connected to the ring gear 78 on the other hand. This secondary side 62' can be supported by a bearing 86 on the output side 82 of the torsional vibration damping arrangement 29, for example, also together with the ring gear 80.

The two friction surface formations 106, 114 are provided in the output region 82, i.e., lie in the torque flow between the coupling arrangement 50 and the driven member 44. Also arranged in this output region 82 is the further oscillation system 90 whose primary side 94 is coupled to the second friction surface formation 114 and whose secondary side 96 is coupled to the driven member 44. This primary side 94, and therefore also the second friction surface formation 114, can be supported on the transmission input shaft 20 by a bearing support 154, for example.

In this embodiment form, the input region 52 of the torsional vibration damping arrangement 29 is fixedly connected to the housing 30. The first friction surface formation 106 is coupled to the ring gear 80 and is also positioned in radial direction by the bearing support 86.

Figure 11:
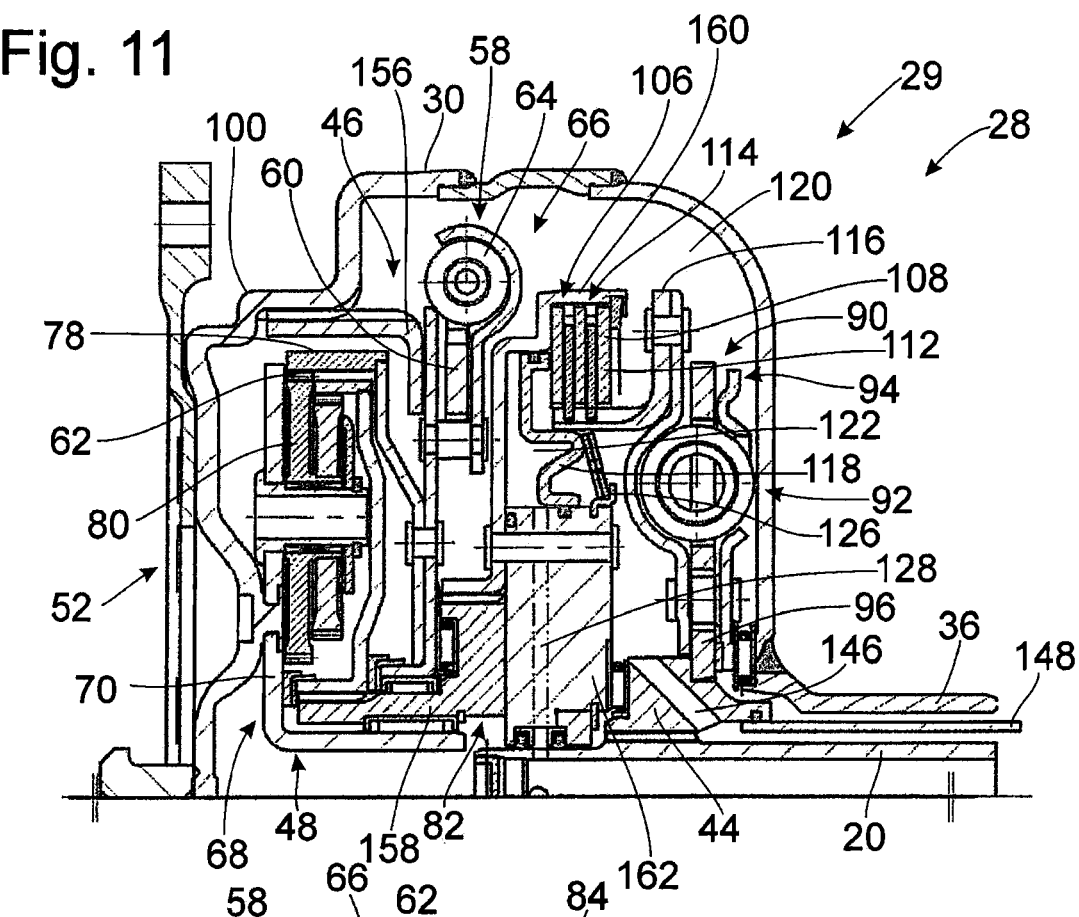
FIG. 11 is a fragmentary longitudinal sectional view of a wet clutch arrangement with a torsional vibration damping arrangement.

FIG. 11 shows an embodiment corresponding to this construction principle from FIG. 10. The input region 52 of the torsional vibration damping arrangement 29 is substantially provided by the housing shell 100 of the housing 30. The planet gear carrier 70 is fixedly connected, e.g., riveted, to this housing 30 on the one hand, while a coupling element 156 of the first torque transmission path 46, which coupling element 156 leads to the oscillation system 66, is held by toothed engagement at the housing shell 100 for common rotation therewith on the other hand. This coupling element 156 is connected to the primary side 60 of the torsional vibration damper 58, in this case substantially formed by a central disk element. The secondary side 62 comprises two cover disk elements which are connected on the one hand to the ring gear 78 which is formed of multiple parts and, on the other hand, are supported radially inwardly on the output region 82. The ring gear 80 is coupled to an intermediate element 158 of the output side 82 by toothed engagement. In axial direction, the ring gear 80 which is here formed of multiple parts is bearing-supported at the planet gear carrier 70 and at the secondary side 62 of the torsional vibration damper 58 which is in turn supported in axial direction at the intermediate element 158. Radially inwardly, the intermediate element 158 is bearing-supported on an axial projection of the planet gear carrier 70.

A friction element carrier 160 which radially outwardly surrounds the first friction elements 108 of the first friction surface formation 106 and is coupled to the latter by toothed engagement is coupled by toothed engagement to the intermediate element 158. The friction element carrier 116 of the second friction surface formation 114 is connected to the primary side 94 of the torsional vibration damper 92 of the further oscillation system 90, which primary side 94 comprises two cover disk elements. Its secondary side 96, provided here by a central disk element, is connected to the driven member 44.

Another intermediate element 162 is fixedly connected, e.g., riveted, to the friction element carrier 160. This intermediate element 162 has the channels 128 for supplying fluid into the second spatial region 122 which is substantially defined in this case between the clutch piston 118 and the friction element carrier 160. The intermediate element 162 radially inwardly surrounds the axial end region of the transmission input shaft 20 and accordingly communicates in a fluid exchange with the latter. A fluid-tight connection of the channels 128 to the transmission input shaft 20 is carried out by means of dynamic seals which are provided at the inner circumference of the intermediate element 162. These dynamic seals can be fixed to the transmission input shaft with a slight pre-loading so as to compensate for a radial offset between the transmission input shaft 20 and the intermediate element 162 or wet clutch arrangement 28. In principle, these seal elements can also be arranged in grooves at the outer circumference of the transmission input shaft and at the inner circumference of the intermediate element 162, respectively.

The supply of fluid or oil into the second spatial region 120 can be carried out via the channels 146 in the driven member 44. To this end, a radial flow channel is formed between the sleeve 148 and the transmission input shaft 20, which radial flow channel is closed with respect to a flow channel formed between the pump drive hub 36 and the sleeve 148 by fluid-tight connection of the driven member 44 to the sleeve 148 by means of a dynamic seal or the like.

The driven member 44 is supported axially with respect to the intermediate element 162 on the one hand and axially with respect to the housing 30 by the further oscillation system 90 on the other hand by means of respective bearing supports. It is to be noted that all of the bearing supports mentioned above can be constructed as rolling element bearing supports, but also as plain bearings. Further, it is possible, of course, to vary the bearing points so that the intermediate element 148, for example, could also be supported radially inwardly on the further extending transmission input shaft 20.

Figure 12:
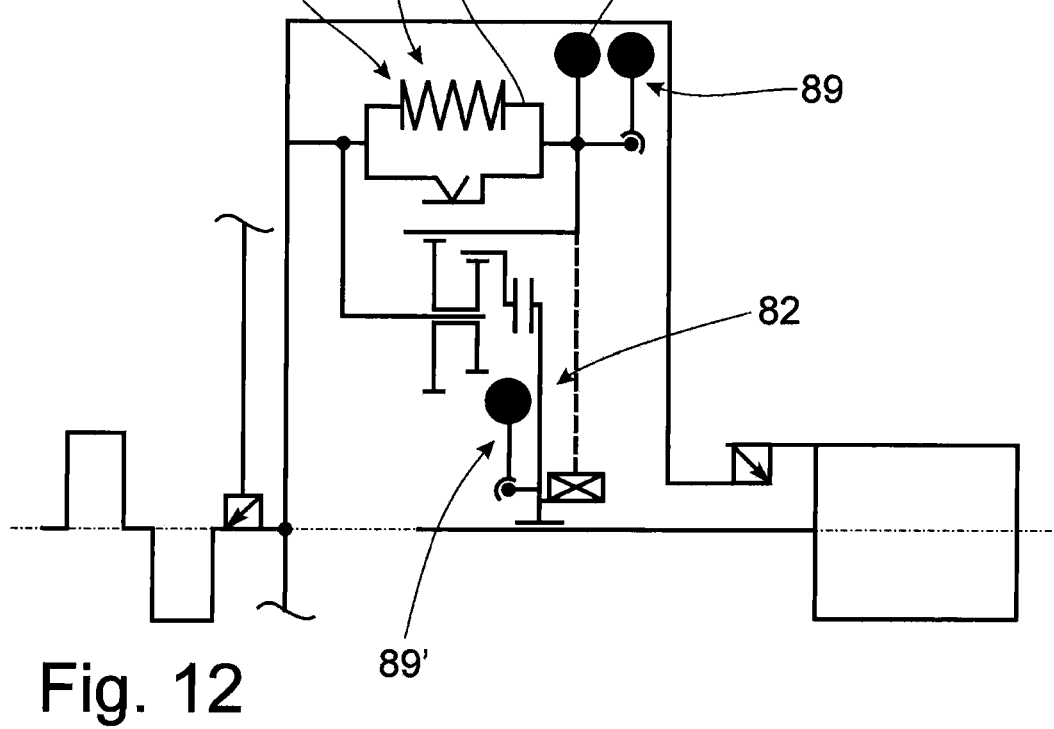
FIG. 12 is a view corresponding to FIG. 3 of an alternative embodiment.

Another modified embodiment form is shown schematically in FIG. 12. With respect to construction, this embodiment form substantially corresponds to the construction described above with reference to FIG. 6. It will be seen that a vibration damping arrangement 89 is connected to the secondary side 62 of the oscillation system 66 or torsional vibration damper 58 in addition to the supplementary mass 84. A vibration damping arrangement 89' is also connected to the output region 82. These vibration arrangements 89 and 89' can be formed as speed-adaptive mass dampers with one or more deflection masses which can be deflected along respective guide paths extending in circumferential direction. These guide paths have vertex regions in which they are at the greatest distance from the axis of rotation A. When the deflection masses are deflected out of these vertex regions, they not only move in circumferential direction but are also guided radially inward so that they absorb potential energy. It is possible by means of the geometry of these guide paths and by the selection of masses of the deflection masses to tune to an exciting oscillation or higher orders, for example, to the firing frequency. Alternatively, it would also be possible to configure a vibration damping arrangement 89, 89' of this kind as a fixed-frequency mass damper. One or more flywheel masses can be provided for this purpose. These flywheel masses can deflect against the return force of springs, generally elastic elements, so that, through the selection of the masses on the one hand and spring constants on the other hand, it is possible to tune to a frequency to be damped.

It is to be noted that, of course, one or more of these vibration damping arrangements 89, 89' can also be provided in the other embodiment forms either in combination or individually and also at other positions for influencing the vibration behavior.

Figure 13:
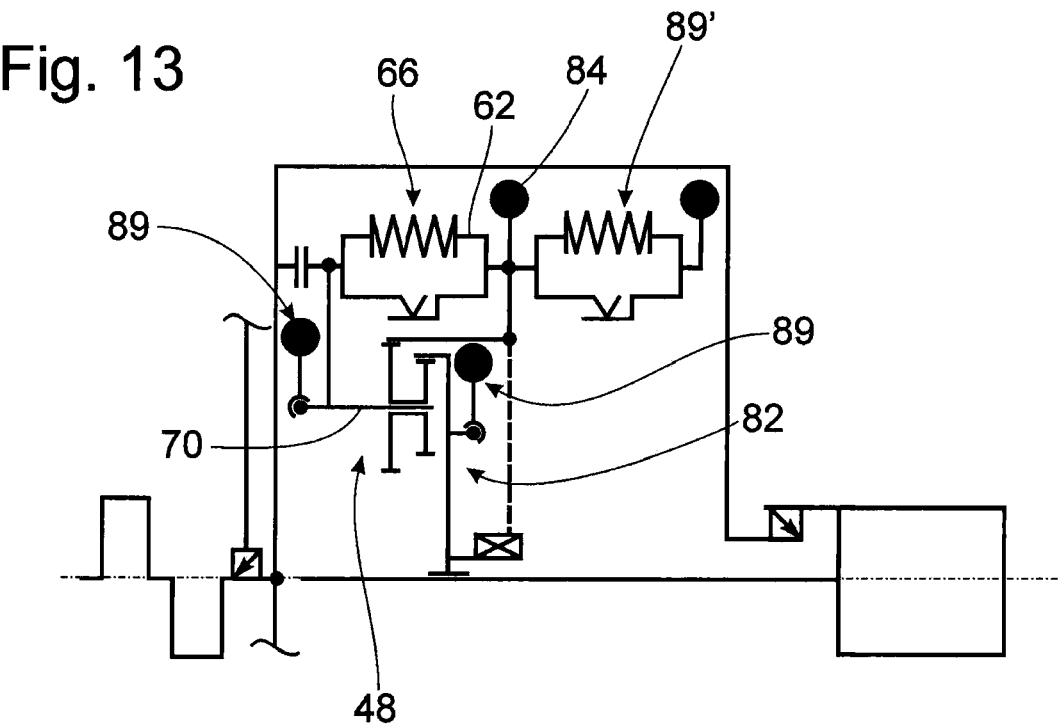
FIG. 13 is a view corresponding to FIG. 3 of an alternative embodiment.

A further embodiment is shown in FIG. 13. With respect to its basic construction, this embodiment corresponds to the embodiment form described with reference to FIG. 1. In this case, speed-adaptive mass dampers, designated respectively by 89, are coupled, for example, to the planet gear carrier 70 of the second torque transmission path 48 and to the output side 82. A vibration damping arrangement 89' formed as fixed-frequency mass damper is connected to the secondary side 62 of the oscillation system 66.

Figure 14:
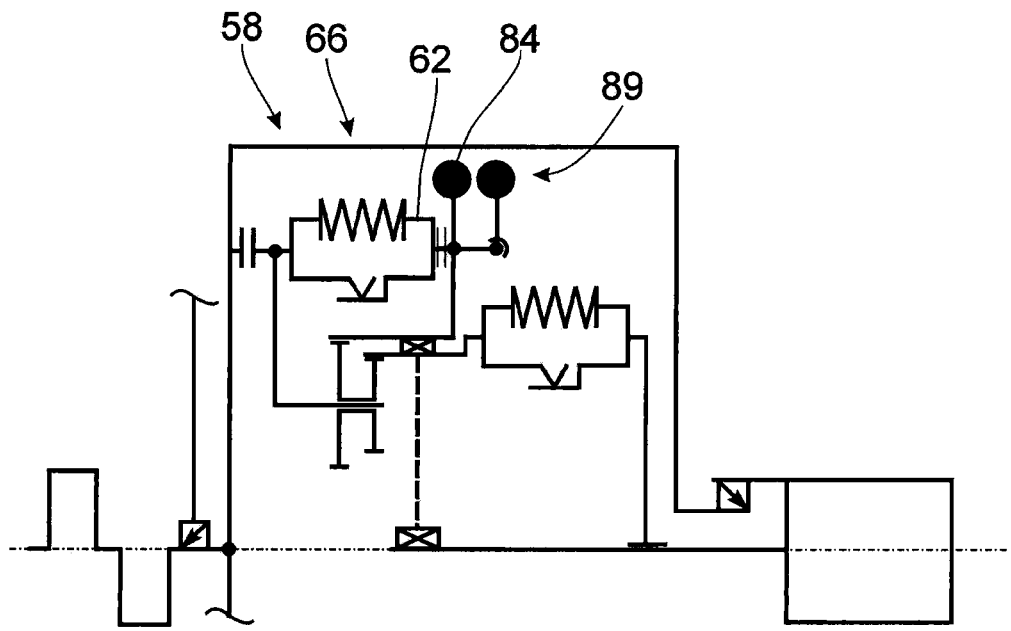
FIG. 14 is a view corresponding to FIG. 3 of an alternative embodiment.

The embodiment shown in FIG. 14 substantially corresponds to that described above referring to FIG. 9. In this case also, a vibration damping arrangement 89 constructed, for example, as fixed-frequency mass damper or speed-adaptive mass damper, is connected to the secondary side 62 of the oscillation system 66 or torsional vibration damper 58. This vibration damping arrangement 89 can be provided as an alternative to or in addition to the supplementary mass 84.

Figure 15:
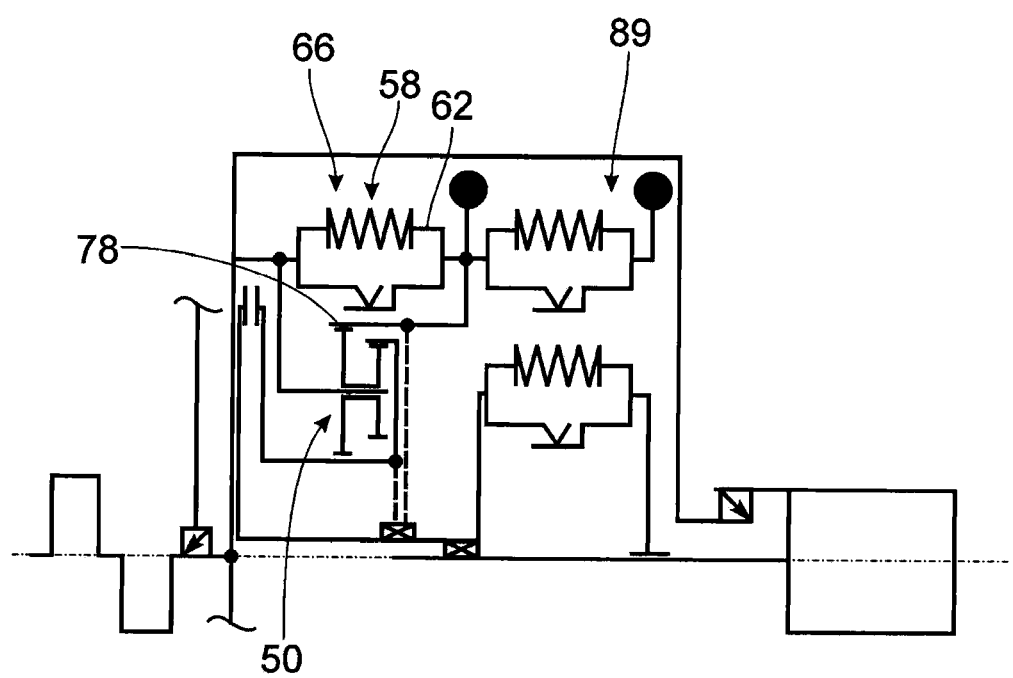
FIG. 15 is a view corresponding to FIG. 3 of an alternative embodiment.

FIG. 15 shows an embodiment which is constructed substantially on the basis of the principle shown in FIG. 10. In this case, however, the oscillation system 66 includes only one individual torsional vibration damper 58 whose secondary side 62 is coupled to the ring gear 78 of the coupling arrangement 50. However, a vibration damping arrangement 89 formed in this case as fixed-frequency mass damper is constructed with this secondary side 62, i.e., with a mass which can deflect against the return action of one or more springs but which is basically freely oscillating. Again, different constructional forms can be selected for these springs, for example, a helical compression spring or helical tension spring, which are constructed, for example, from steel material or elastic material, e.g., rubber material.

Further, it must be emphasized that due to the fact that when the torsional vibration damping arrangement is effective a relative rotation of the input region with respect to the output region thereof takes place only in an angular range determined by the elasticity of the oscillation system. This means that the coupling arrangement also undergoes only comparatively small relative rotational movements between the planet gears on the one hand and the ring gears or sun gears on the other hand. While the planet gears, ring gears or sun gears can be configured as gears which completely revolve around their respective axis of rotation for reasons of symmetry and because of the comparatively simple construction, it is also possible to use segmented gears for the planet gears on the one hand and for the ring gears and sun gears on the other hand, these segments being dimensioned in such a way that they allow the required relative rotatability while maintaining the toothed engagement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A wet clutch arrangement, comprising:
a housing arrangement fillable with a fluid;
a first friction surface formation which is rotatable with the housing arrangement around an axis of rotation;
a driven member;
a clutch piston;
a second friction surface formation which is rotatable with the driven member around the axis of rotation and which can be brought into frictional engagement with the first friction surface formation by the clutch piston;
a torque transmission path between the housing arrangement and the driven member; and
a torsional vibration damping arrangement, wherein:
at least a portion of the torsional vibration damping arrangement is provided in the torque transmission path between the housing arrangement and the driven member,
the torsional vibration damping arrangement includes an input region and an output region,
a first torque transmission path is provided between the input region and the output region,
a second torque transmission path parallel to the first torque transmission path is provided between the input region and the output region,
the torsional vibration damping arrangement includes at least in the first torque transmission path a phase shifter arrangement for generating a phase shift of rotational irregularities transmitted via the first torque transmission path relative to rotational irregularities transmitted via the second torque transmission path, and
a coupling arrangement for superposing torques transmitted via the first and second torque transmission paths is provided between the input region and the output region;
wherein the coupling arrangement is a planetary transmission arrangement.

2. The wet clutch arrangement according to claim 1, wherein the first friction surface formation and the second friction surface formation are provided one of:
in a torque flow between the housing arrangement and the torsional vibration damping arrangement, and
between the torsional vibration damping arrangement and the driven member.

3. The wet clutch arrangement according to claim 1, wherein the first friction surface formation and the second friction surface formation are provided in a torque flow between the phase shifter arrangement and the coupling arrangement.

4. The wet clutch arrangement according to claim 1, wherein the first friction surface formation and the second friction surface formation are provided in a torque flow between the housing arrangement and the coupling arrangement.

5. The wet clutch arrangement according to claim 1, wherein one of the first friction surface formation and the second friction surface formation includes at least one annular disk-shaped friction element capable of being pressed by the clutch piston into a frictional engagement with an annular disk-shaped friction element of another one of the first friction surface formation and the second friction surface formation.

6. The wet clutch arrangement according to claim 1, wherein the phase shifter arrangement includes an oscillation system including a primary side and a secondary side which is rotatable relative to the primary side around the axis of rotation against a force of a spring arrangement.

7. The wet clutch arrangement according to claim 6, wherein the output region includes a further oscillation system having a primary side and a secondary side which is rotatable relative to the primary side of the further oscillation system against an action of a further spring arrangement.

8. The wet clutch arrangement according to claim 1, wherein the driven member includes a driven hub for coupling to a driven shaft for common rotation around the axis of rotation.

9. The wet clutch arrangement according to claim 8, wherein the driven shaft includes a transmission input shaft.

10. The wet clutch arrangement according to claim 1, wherein the housing arrangement includes a drive formation for driving a fluid pump for conveying the fluid into the housing arrangement.

11. The wet clutch arrangement according to claim 1, wherein the planetary transmission arrangement includes a planet gear carrier connected to the second torque transmission path and which has a plurality of planet gears rotatably supported thereon.

12. The wet clutch arrangement according to claim 11, wherein the planetary transmission arrangement includes:
a first coupling gear arrangement in meshing engagement with the planet gears and connected to the first torque transmission path, and
a second coupling gear arrangement in meshing engagement with the planet gears and connected to the output region.

13. The wet clutch arrangement according to claim 12, wherein the first coupling gear arrangement in connection with the planet gears and the second coupling gear arrangement in connection with the planet gears provide transmission ratios that differ from one another.

14. The wet clutch arrangement according to claim 12, wherein each one of the first coupling gear arrangement and the second coupling gear arrangement includes a ring gear arrangement.

15. The wet clutch arrangement according to claim 12, wherein each one of the first coupling gear arrangement and the second coupling gear arrangement includes a sun gear arrangement.

16. The wet clutch arrangement according to claim 7, wherein at least one the oscillation system and the further oscillation system includes at least two vibration dampers arranged in series with one another and respectively comprising a primary side and a secondary side which is rotatable relative to the primary side.

17. The wet clutch arrangement according to claim 7, wherein at least one of the oscillation system and the further oscillation system includes at least two vibration dampers which work in parallel with one another and respectively comprise a primary side and a secondary side which is rotatable relative to the primary side.

18. The wet clutch arrangement according to claim 7, wherein at least one of the oscillation system and the further oscillation system includes a speed-adaptive vibration damping arrangement having at least one deflection mass which can be deflected in a circumferential direction from a basic position and which in so doing changes its distance from the axis of rotation.

19. The wet clutch arrangement according to claim 7, wherein at least one of the oscillation system and the further oscillation system includes a fixed-frequency vibration damping arrangement having at least one oscillation mass which can be deflected against an action of a return spring arrangement.

20. The wet clutch arrangement according to claim 7, further comprising a friction damping arrangement associated with at least one of the oscillation system and the further oscillation system, the friction damping arrangement opposing a relative rotation between respective ones of the primary sides and the secondary sides of the oscillation system and the further oscillation system.

21. The wet clutch arrangement according to claim 1, wherein the wet clutch arrangement is for a drivetrain of a vehicle.

\* \* \* \* \*